Patented Jan. 3, 1950

2,493,711

UNITED STATES PATENT OFFICE 2,493,711

DI-ARYLOXY-METHANES

Edgar C. Britton and Ezra Monroe, Midland, and Clare R. Hand, Stanford, Mich., assignors to The Dow Chemical Company, Midland, Mich., a corporation of Delaware No Drawing. Application September 2, 1948, Serial No. 47,554

4 Claims. (Cl. 260—613)

This invention is directed to di-(aryloxy)-methanes having the following formula:

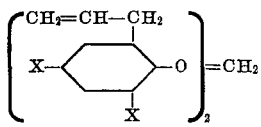

wherein one X is hydrogen and the other X is hydrogen, chlorine, methoxy, cyclohexyl, or a lower alkyl radical containing from 1 to 4 carbon atoms, inclusive. These compounds are useful as insecticides and as intermediates in the preparation of more complex organic derivatives. The compounds are oils or low-melting solids, somewhat soluble in many organic solvents, and substantially insoluble in water.

The new compounds are prepared by reacting a methylene halide, e. g. dichloro- or dibromo-methane, with an alkali metal salt of 2-allyl-phenol or derivative thereof substituted in the 4- or 6-position with a non-reactive substituent, e. g. chlorine, methoxy, cyclohexyl or a lower alkyl radical. The phenolate employed is preferably a sodium salt, and may be prepared by reacting equimolecular proportions of sodium hydroxide with the desired phenol in a solvent, such as methanol, ethanol or toluene. A one-half molecular proportion of the methylene halide is then added to the mixture and the latter heated to a temperature ranging between about 90° and 140° C. and under autogenous pressure for a period of time required to accomplish the reaction. Following completion of the reaction, the crude mixture is washed several times with water. The desired di-(aryloxy)-methane may be separated in any convenient fashion, e. g. the crude reaction product may be fractionally distilled under reduced pressure, or fractionally crystallized from organic solvents.

In a representative preparation, 0.71 kilogram (17.7 mols) of sodium hydroxide was dissolved under reflux in 1.803 kilograms of methyl alcohol. 22.67 kilograms (16.9 mols) of 2-allyl-phenol was added to the alcoholic sodium hydroxide solution to form the sodium salt of the phenol. 0.718 kilogram (8.45 mols) of dichloromethane was then mixed with the phenolate solution and the reaction mixture heated in a pressure reactor at 106° to 117° C. for 12.5 hours. At the end of this period, the reactor and contents were cooled and the crude reaction mixture discharged into an excess of water. The organic products of reaction were recovered from the water dispersion by extraction with chlorobenzene, and the washed benzene extract fractionally distilled under reduced pressure. From this fractionation was obtained 1.309 kilograms of di-(2-allylphenoxy)-methane as an oily liquid boiling at 180°–181° C. at 1 millimeter pressure and having a refractive index n/D of 1.5580 at 25° C.

In a similar manner other substituted phenols were reacted with dichloro-methane to obtain di-(aryloxy)-methane compounds of which the following are representative.

Di-(2-allyl-4-chloro-phenoxy)-methane (from 2-allyl-4-chloro-phenol), an oily liquid having a refractive index n/D of 1.5754 at 25° C.

Di-(2-allyl-6-chloro-phenoxy)-methane (from 2-allyl-6-chloro-phenol), an oily liquid having a refractive index n/D of 1.5695 at 25° C.

Di-(2-allyl-4-methyl-phenoxy)-methane (from 2-allyl-4-methyl-phenol), an oily liquid having a refractive index n/D of 1.5528 at 25° C.

Di-(2-allyl-6-secondarybutyl-phenoxy)-methane (from 2-allyl-6-secondarybutyl-phenol), an oily liquid having a refractive index n/D of 1.5350 at 25° C.

Di-(2-allyl-4-methoxy-phenoxy)-methane (from 2-allyl-4-methoxy-phenol), an oily liquid having a refractive index n/D of 1.5587 at 25° C.

Di-(2-allyl-6-cyclohexyl-phenoxy)-methane (from 2-allyl-6-cyclohexyl-phenol), an oily liquid having a refractive index n/D of 1.5588 at 25° C.

We have found that the new compounds are effective as agricultural insecticides and may be employed in amounts required for insect control with negligible injury to plant foliage. For insecticidal use the compounds may be dispersed in a finely divided solid as a dry mixture. Such mixture may be suspended in water with the aid of a wetting agent, if desired, and the suspension applied in the form of a spray to the plants. Suitable concentrations of the toxicants in such water suspensions are in the order of from about 0.25 to 3 pounds per 100 gallons of the spray mixture. Representative organisms controlled by the new compounds include Mexican bean beetle, two-spotted spider mite, and bean aphid.

In representative operations, concentrates were prepared by mixing together 80 parts by weight of toxicant, 10 parts of the dioctyl ester of sodium sulfosuccinic acid (Aerosol O. T.), and 10 parts of refined kerosene. The concentrates were then dispersed in water to form spray compositions containing various amounts of toxicant per 100 gallons. The toxicants employed together with concentrations and percentage controls are shown in the following table.

| Toxicant | Organism | Pounds of Toxicant Per 100 Gallons | Percentage Control |
|---|---|---|---|
| Di-(2-allyl-phenoxy)-methane | Bean aphids | 1.00 | 100 |
| Do | Mexican bean beetle (larvae) | 0.25 | 100 |
| Di-(2-allyl-4-chloro-phenoxy)-methane | Two-spotted spider mite | 1.00 | 100 |
| Do | Mexican bean beetle (larvae) | 1.00 | 100 |
| Di-(2-allyl-6-chloro-phenoxy)-methane | Two-spotted spider mite | 1.00 | 100 |
| Do | Mexican bean beetle (larvae) | 0.50 | 100 |

In a similar manner aqueous sprays were prepared from concentrates consisting of 60 parts by weight of toxicant, 10 parts of the dioctyl ester of sodium sulfosuccinic acid (Aerosol O. T.) and 30 parts of refined kerosene, and employed with the following results:

| Toxicant | Organism | Pounds of Toxicant Per 100 Gallons | Percentage Control |
|---|---|---|---|
| Di-(2-allyl-4-methoxyphenoxy)-methane | Bean aphid | 0.50 | 100 |
| Do | Two-spotted spider mite | 1.00 | 100 |
| Do | Mexican bean beetle (larvae) | 0.25 | 100 |
| Di-(2-allyl-6-secondarybutyl-phenoxy)-methane | Two-spotted spider mite | 3.00 | 96 |
| Di-(2-allyl-6-cyclohexylphenoxy)-methane | do | 3.00 | 97 |

Aqueous sprays were also prepared from a concentrate consisting of 25 parts by weight of di-(2-allyl-4-methylphenoxy)-methane, 10 parts of the dioctyl ester of sodium sulfosuccinic acid (Aerosol O. T.) and 65 parts of refined kerosene. When employed for the control of two-spotted spider mite, a 100 per cent kill of the test organisms was obtained at a toxicant concentration of 1 pound per 100 gallons of spray mixture.

We claim:
1. A di-(aryloxy)-methane having the following formula:

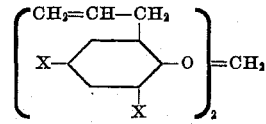

wherein one X is hydrogen and the other X represents a member of the group consisting of hydrogen, chlorine, methoxy, cyclohexyl and lower alkyl radicals containing from 1 to 4 carbon atoms, inclusive.

2. Di-(2-allyl-4-methoxy-phenoxy)-methane.

3. Di-(2-allyl-4-chloro-phenoxy)-methane.

4. Di-(2-allyl-phenoxy)-methane.

EDGAR C. BRITTON.
EZRA MONROE.
CLARE R. HAND.

REFERENCES CITED

The following references are of record in the file of this patent:

UNITED STATES PATENTS

| Number | Name | Date |
|---|---|---|
| 2,330,234 | Moyle | Sept. 28, 1943 |